United States Patent
Ray et al.

(10) Patent No.: US 9,689,452 B2
(45) Date of Patent: Jun. 27, 2017

(54) METHOD FOR ASSEMBLING A PENDULUM-TYPE DAMPING DEVICE AND DAMPING DEVICE

(71) Applicant: VALEO EMBRAYAGES, Amiens (FR)

(72) Inventors: Marc Ray, Amiens (FR); Roel Verhoog, Gournay sur Aronde (FR); Franck Cailleret, Amiens (FR); Michael Hennebelle, Houdain (FR)

(73) Assignee: Valeo Embrayages (FR)

( * ) Notice: Subject to any disclaimer, the term of this patent is extended or adjusted under 35 U.S.C. 154(b) by 32 days.

(21) Appl. No.: 14/466,674

(22) Filed: Aug. 22, 2014

(65) Prior Publication Data
US 2015/0053519 A1 Feb. 26, 2015

(30) Foreign Application Priority Data
Aug. 23, 2013 (FR) ...................... 13 58154

(51) Int. Cl.
*F16F 7/10* (2006.01)
*F16F 15/14* (2006.01)

(52) U.S. Cl.
CPC .............. *F16F 7/10* (2013.01); *F16F 15/145* (2013.01); *Y10T 29/49945* (2015.01)

(58) Field of Classification Search
CPC .......... F16F 15/30; F16F 15/31; F16F 15/145; F16F 15/1428; F16F 15/13128; F16F 7/1022; F16F 7/10; B64G 1/283; F02P 5/06; F16H 2045/0263; Y10T 29/49945

USPC ............ 188/378–380, 268, 218 A; 74/574.2, 74/574.4, 572.1, 572.11; 464/180
See application file for complete search history.

(56) References Cited

U.S. PATENT DOCUMENTS

| | | | | |
|---|---|---|---|---|
| 5,884,735 A | * | 3/1999 | Eckel et al. .......... | F16F 15/145 188/378 |
| 6,280,330 B1 | * | 8/2001 | Eckel et al. ...... | F16F 15/13142 464/3 |
| 9,322,438 B2 | * | 4/2016 | Verhoog et al. ...... | F16F 15/145 |
| 2002/0062713 A1 | * | 5/2002 | Feldhaus et al. ..... | F16F 15/145 464/180 |
| 2010/0122605 A1 | * | 5/2010 | Maienschein et al. .................. | F16F 15/1457 74/574.2 |
| 2012/0031226 A1 | * | 2/2012 | Jung ..................... | F16F 15/145 74/574.4 |
| 2016/0153521 A1 | * | 6/2016 | Tondellier ............ | F16F 15/145 74/574.2 |

FOREIGN PATENT DOCUMENTS

EP 1744074 A2 * 1/2007
WO WO-2013/057440 A1 * 4/2013

* cited by examiner

*Primary Examiner* — Pamela Rodriguez
(74) *Attorney, Agent, or Firm* — Berenato & White, LLC

(57) ABSTRACT

A method for assembling a pendulum-type damping device (1) includes the steps of force-fitting a first end of the spacer (17) into an opening (26) of a first part (3a) of a pendulum mass (3). A support (2) is positioned so that the spacer (17) spans a corresponding opening of the support (2). A roller is positioned between the spacer (17) and the edge of the opening of the support (2). The second end (17b) of the spacer (17) is force fit into an opening (26) of a second part (3b) of the mass (3).

19 Claims, 16 Drawing Sheets

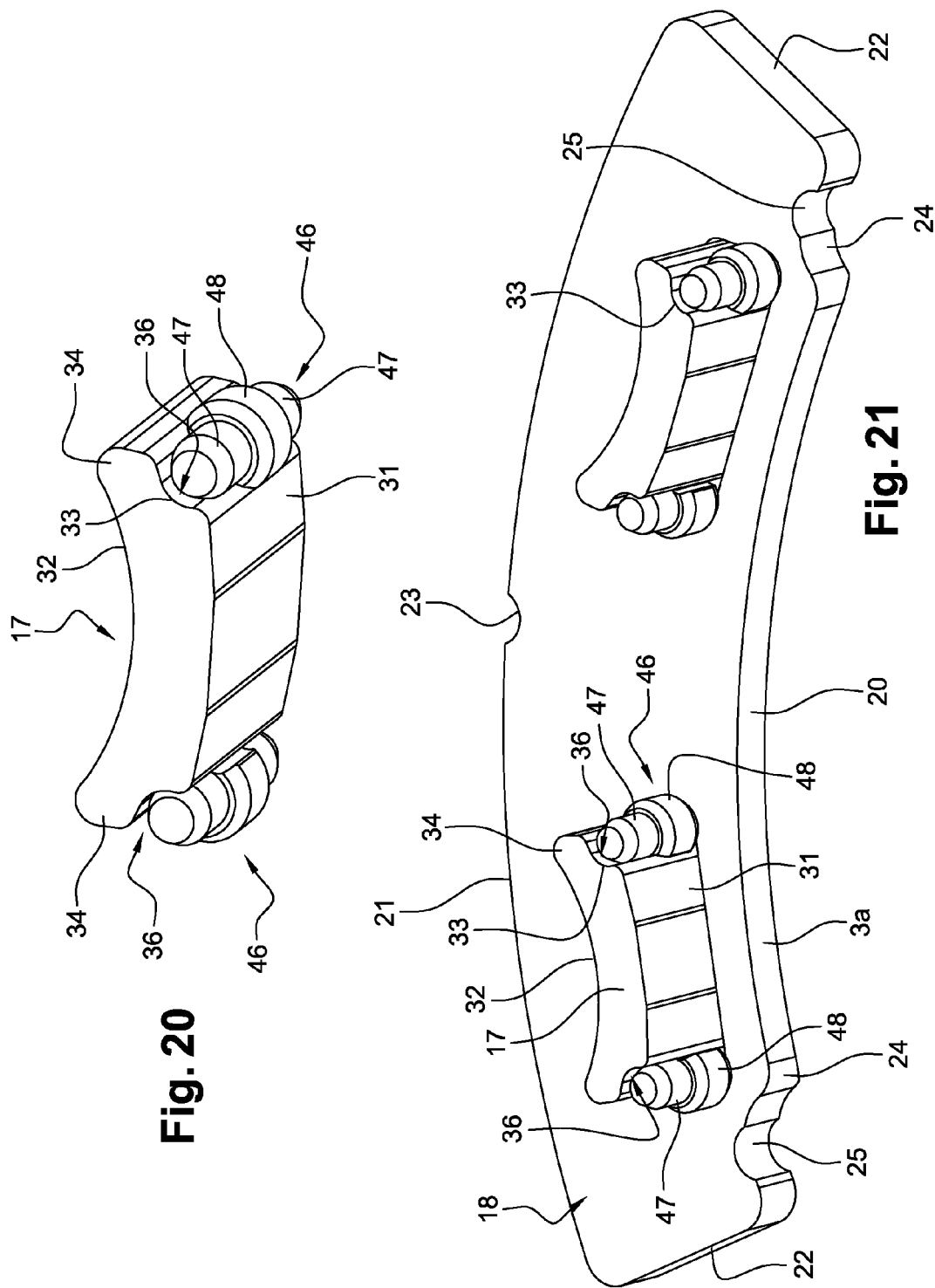

METHOD FOR ASSEMBLING A PENDULUM-TYPE DAMPING DEVICE AND DAMPING DEVICE

CROSS-REFERENCE TO RELATED APPLICATIONS AND CLAIM TO PRIORITY

This application claims priority to Patent Application No. 1358154 filed in France on Aug. 23, 2013 of which disclosure is incorporated herein by reference and to which priority is claimed.

FIELD OF THE INVENTION

The invention relates to a method for assembling a pendulum-type damping device and a damping device assembled in accordance with the method.

BACKGROUND OF THE INVENTION

A device of this kind, also called a "pendulum oscillator" or "pendulum," is intended in particular to be part of a transmission of a motor vehicle.

In a motor vehicle transmission, at least one torsion damping system is usually combined with a clutch capable of selectively connecting the engine to the gearbox.

A combustion engine exhibits irregularities due to the successive combustion events in the engine's cylinders, said irregularities varying in particular depending on the number of cylinders.

The damping system conventionally has springs and friction elements whose function is to filter vibrations due to rotational irregularities of the engine, and takes effect before engine torque is transmitted to the gearbox. This allows such vibrations to be prevented from entering the gearbox and causing shocks, noise, and undesirable acoustic impacts therein.

In order to improve filtration further, it is known to use a pendulum-type damping device in addition to the usual damping device.

The Applicant's patent application FR 2981714 discloses a pendulum-type damping device having an annular support intended to be rotationally driven around its axis, and pendulum masses mounted on the outer periphery of the support. Each mass has a pendulum motion imparted to it during operation, and has two parts mounted axially on either side of the support and connected by two spacers each spanning an opening of the support. A roller is mounted between a rolling track configured in each spacer and the edge of the corresponding opening of the support.

In reaction to rotational irregularities, each mass shifts so that its center of mass oscillates in pendulum fashion. The oscillation frequency of each mass is proportional to the rotation speed of the driving shaft; the corresponding multiple can assume, for example, a value close to the predominant harmonic order of the vibrations responsible for strong rotational inconsistencies at close to idle speed.

The spacers are fastened to the two parts of the mass by riveting. The heads of the rivets abut against the outer radial faces of the parts of the mass, i.e. against the faces opposite to the annular support, and thus protrude axially from said parts of the mass. The volume thereby swept out during operation is relatively large, so that surrounding parts need to be dimensioned accordingly.

The load-bearing section of the rivet is essentially weaker than the total cross section of the part to be connected, thus weaker than the force-fitted spacer. The shapes of the spacer are simpler and thus easier to manufacture.

SUMMARY OF THE INVENTION

The invention aims to overcome this disadvantage by proposing for this purpose a method for assembling a pendulum-type damping device having at least one pendulum mass mounted movably on a support, said mass having two parts disposed on either side of the support and connected by at least one spacer spanning an opening of the support, a roller being disposed between the spacer and the edge of said opening, wherein it has the steps of:
 (a) force-fitting a first end of the spacer into an opening of said first part;
 (b) positioning the support so that the spacer spans the corresponding opening of the support;
 (c) positioning the roller between the spacer and the edge of the opening of the support;
 (d) force-fitting a second end of the spacer into an opening of a second part of the mass.

Force-fitting of each end of the spacer into an opening of one of the parts of the mass allows the overall dimensions of the mass to be reduced. Specifically, it is not necessary for the ends of the spacer to extend axially out of said openings.

The ends of the spacer are preferably fitted in such a way that they are flush with the outer surfaces of the parts of the masses, i.e. the surfaces opposite the support.

According to a characteristic of the invention, at least one of the ends of the spacer is then welded to the part of the mass.

According to a characteristic of the invention the spacer is positioned, with respect to the first part of the mass and/or with respect to the second part of the mass, with the aid of guidance studs.

This ensures proper positioning of the two parts of the mass and the spacer throughout assembly.

In particular, each part of the mass can be guided with respect to a first frame with the aid of at least one first guidance stud projecting from the first frame.

In addition, the first end of the spacer can be guided with respect to the first frame with the aid of at least one second guidance stud projecting from the first frame.

The second end of the spacer can furthermore be guided with respect to a second frame with the aid of at least one third guidance stud projecting from the second frame.

In this case the ends of the spacer can be force-fitted into the corresponding openings of the parts of the mass by bringing together the first and second frames abutting respectively against the first part and the second part of the mass.

Each frame thus comes into abutment against one of the parts of the mass so as to ensure fitting of the ends of the spacer into the openings of said parts.

According to another characteristic of the invention, the second guidance stud and/or the third guidance stud span the opening of the corresponding part of the mass during steps (a) and (d).

Preferably each part of the mass has a radially inner edge and a radially outer edge, the first frame having three first guidance studs, two of which are received in complementary receptacles of the radially inner edge of each part of the mass and one of which is received in a complementary receptacle of the radially outer edge of each part of the mass, or vice versa.

Each part of the mass is thus held in position on the first frame with the aid of the first guidance studs.

In addition, the spacer can have a radially inner edge and a radially outer edge, the first frame and second frame respectively having three second guidance studs and three third guidance studs, two of which are received in complementary receptacles at the radially inner edge of each spacer and one of which is received in a complementary receptacle at the radially outer edge of the spacer, or vice versa.

Advantageously, each end of the spacer has a curved radially inner edge and/or a curved radially outer edge, so that each end flexes when it is force-fitted into the opening of the first part and/or second part of the mass.

Similarly, each part of the mass can have a deformable region situated radially inwardly from the opening serving for force-fitting of the spacer, said region deforming upon force-fitting of the corresponding end of the spacer.

Lastly, the spacer can be equipped with at least one stop intended to come into abutment against the edge of the opening of the support during operation, i.e. upon movement of the masses with respect to the support.

The invention also relates to a pendulum-type damping device having at least one pendulum mass mounted movably on a support intended to be rotationally driven, said mass having two parts disposed on either side of the support and connected by at least one spacer spanning an opening of the support, a roller being disposed between the spacer and the edge of said opening, wherein the ends of the spacer are fastened to the two parts of the mass by force-fitting.

Preferably the ends of the spacer are flush with the outer surfaces of the parts of the masses, i.e. the surfaces opposite the support.

At least one of the ends of the spacer is also fastened to the part of the mass by welding in addition to force-fitting. In this case provision can be made to fit the end of the spacer to a depth just sufficient to hold the spacer in place on the part of the mass, then a weld is made at the joining point between the spacer and the part of the mass.

Preferably the end of the spacer is fitted so as to be flush with a face of the mass that is opposite another face of the same mass through which the spacer is introduced.

BRIEF DESCRIPTION OF THE DRAWINGS

The invention will be better understood, and other details, advantages, and characteristics of the invention will emerge, from the description below provided as a non-limiting example referring to the attached drawings, in which:

FIG. 20 is a perspective view of a spacer equipped with stop means according to a first embodiment;

FIGS. 21 and 22 are perspective views illustrating assembly of the spacer and of the stop means of FIG. 20 onto the two parts of a mass;

DETAILED DESCRIPTION

Figure 1:
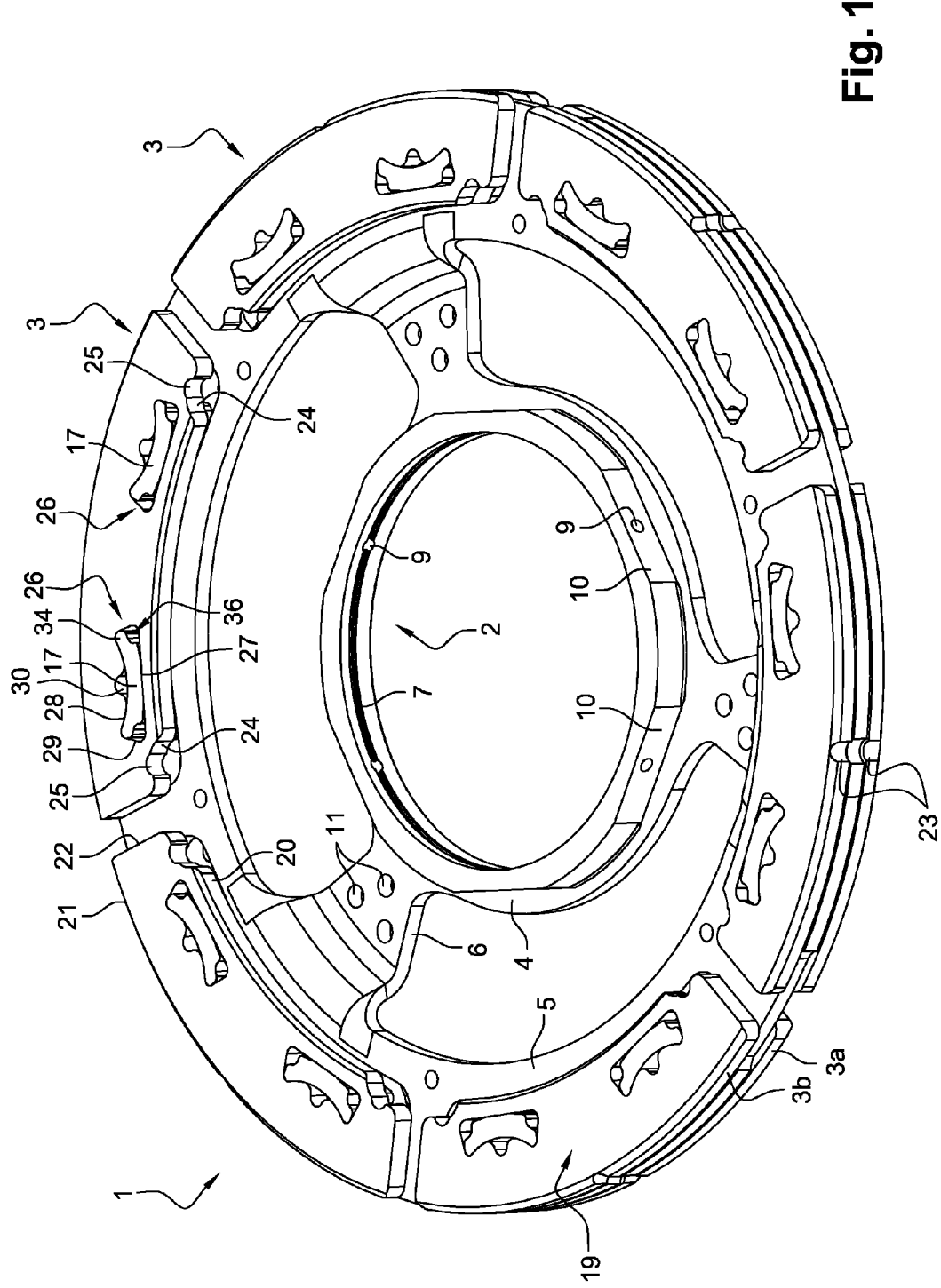
FIG. 1 is a perspective view of a pendulum-type damping device according to the invention.

FIG. 1 depicts a pendulum-type damping device 1 according to the invention, having an annular support 2 on which masses 3 are movably mounted.

Annular support 2 has an inner annular part 4 connected to an outer annular part 5 by radially extending tabs 6. The plane of inner annular part 4 is offset axially from that of outer annular part 5.

The inner cylindrical surface of inner annular part 4 has an annular channel 7 opening radially inward. Inner annular part 4 furthermore has radial holes 9 opening into channel 7. Lastly, inner annular part 4 has planar regions 10 at which radial holes 9 terminate. The channel receives a circlip that functions as an axial and angular stop. Each radial tab 6 has three holes 11 serving for the passage of rivets for fastening to a system for driving springs of the main damper.

Figure 4:
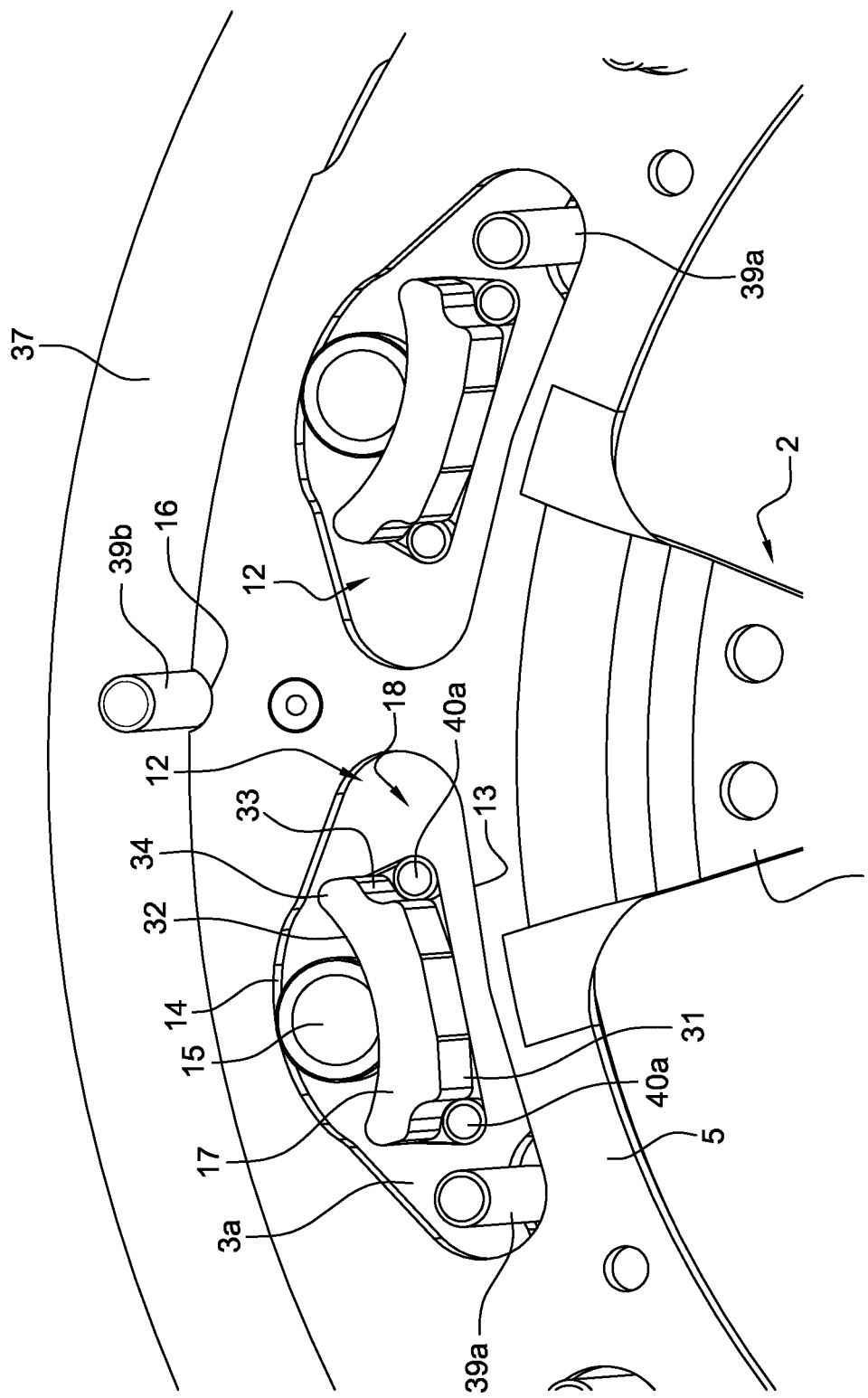

In addition, outer annular part 5 of support 2 has six pairs of openings 12 (FIG. 4). Each opening 12 has the general shape of an isosceles triangle whose vertices are rounded and whose base 13 is located radially inwardly. Vertex 14 opposite base 13 is curved, and forms a rolling track intended to interact with a roller 15.

Semicircular recesses 16 are furthermore configured at the outer periphery of outer annular part 5. More specifically, each recess 16 is situated circumferentially between the two openings 12 of a single pair.

Six masses 3 are mounted on outer annular part 5 of support 2. Each mass 3 has a first part 3a and a second part 3b disposed axially on either side of support 2, facing one another. The two parts 3a, 3b are connected to one another via two spacers 17.

Figure 3:
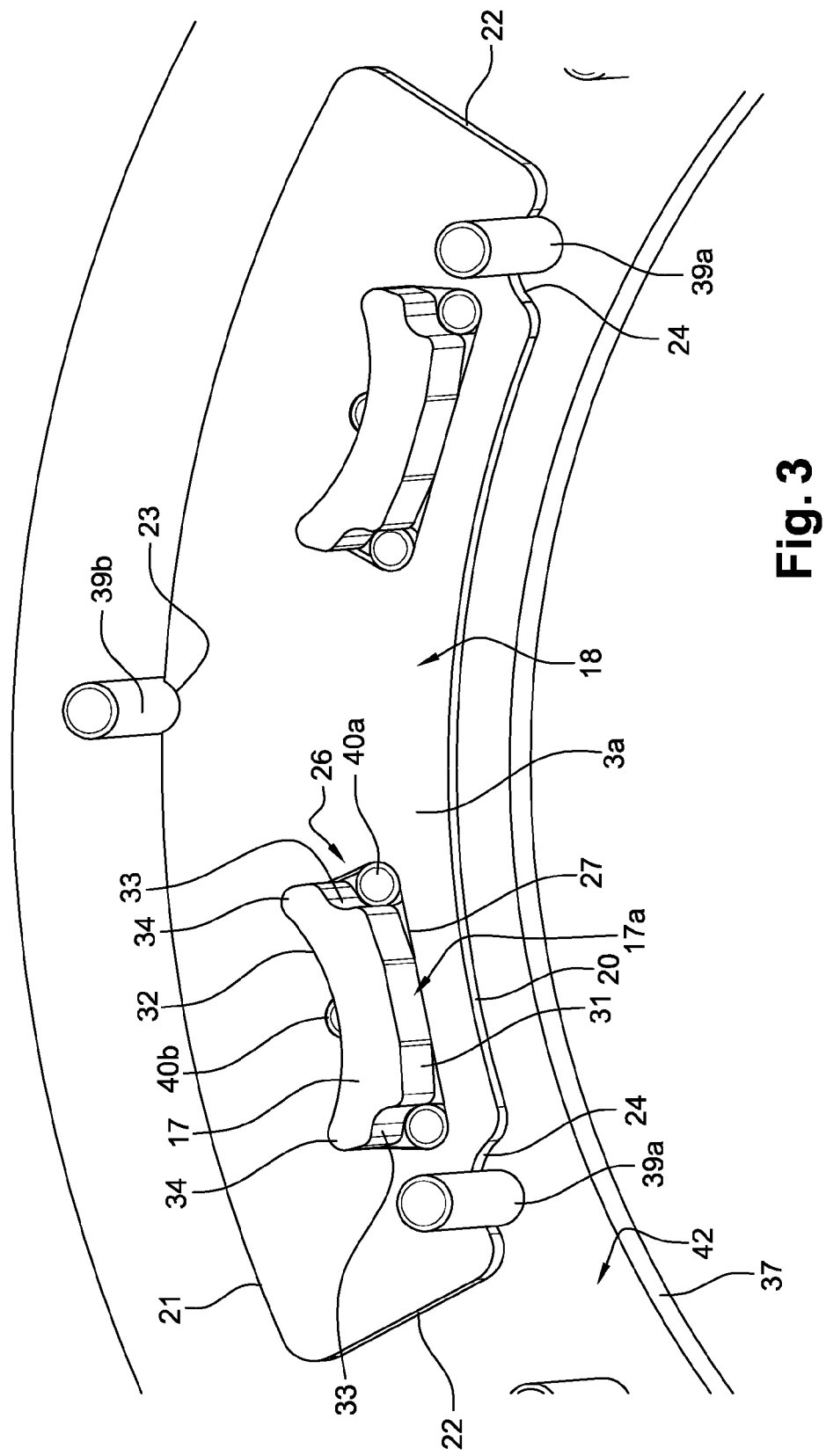
FIGS. 3 through 12 are views illustrating different successive steps of the method for assembling the device of FIGS. 1 and 2 in accordance with the invention.

Each part 3a, 3b of mass 3 has a so-called "inner" radial face 18 (FIG. 3) facing toward support 2, and an outer radial face 19 (FIG. 1) opposite to inner radial face 18. In addition, each part 3a, 3b is in the shape of a circular arc and has a curved radially inner peripheral edge 20 and a curved radially outer peripheral edge 21, connected by radial lateral edges 22. Outer peripheral edge 21 has a semicircular recess 23 situated opposite one of the recesses 16 of outer annular part 5 of support 2 when mass is in the position depicted in FIG. 1 (assembly position or initial position).

Inner peripheral edge 20 of each part has cutouts 24 at its circumferential ends. A semicircular recess 25 is moreover configured at each cutout 24.

Lastly, each part 3a, 3b exhibits two openings 26 intended for assembly of spacers 17 by force-fitting. Each opening 26 is oblong in shape and has a globally rectilinear radially inner edge 27 and an arc-shaped radially outer edge 28, connected by two rectilinear lateral edges 29. The connecting regions between lateral edges 29 on the one hand and radially inner 27 and outer edges 28 on the other hand, are rounded. Radially outer edge 28 exhibits a rounded recess 30 in the middle part. Recess 30 also serves to detect the presence of the roller once assembly is complete.

Figure 2:
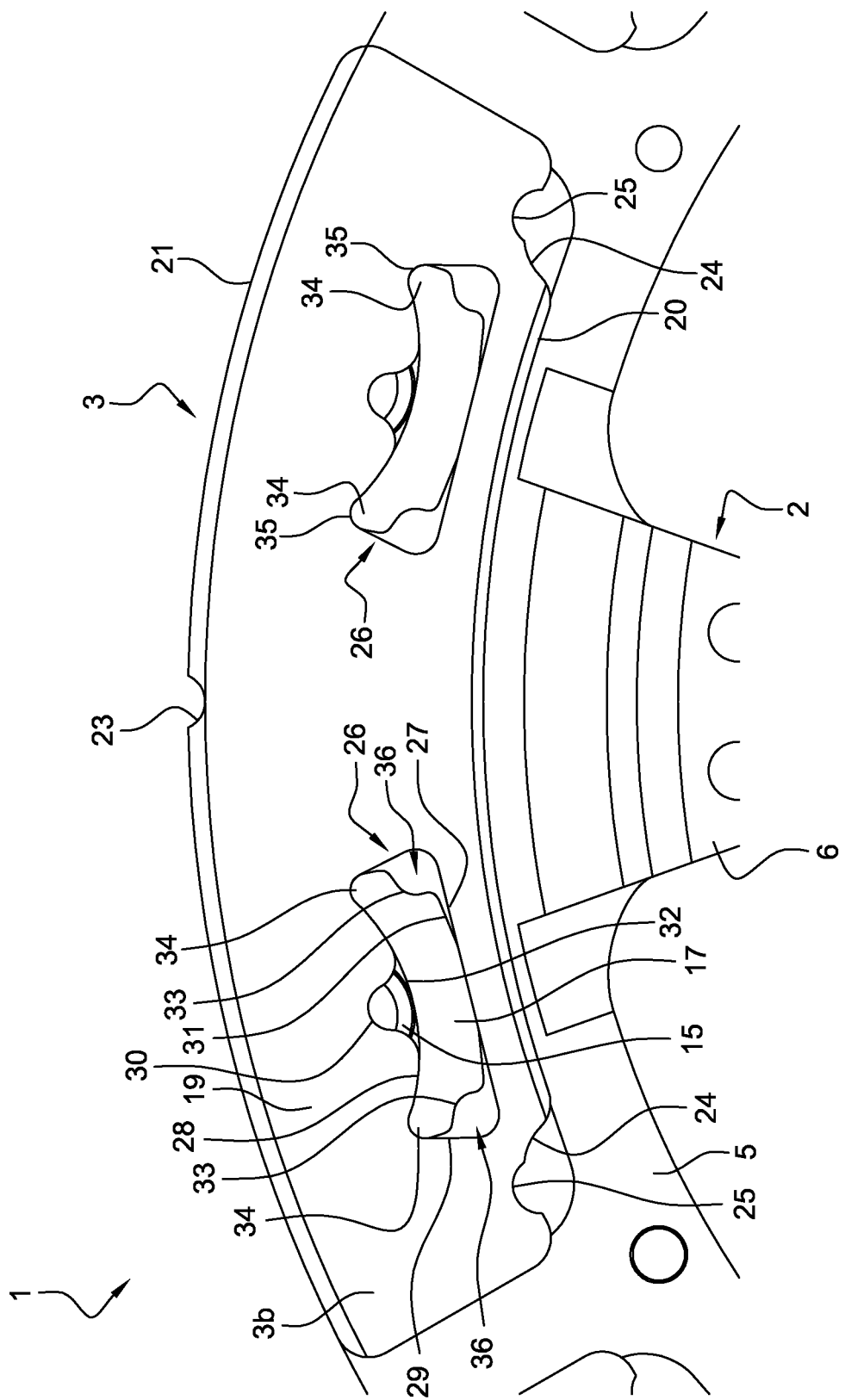
FIG. 2 is a frontal view of a part of the device of FIG. 1.

Each spacer has a globally constant cross section over its entire length. More particularly, each spacer has a curved inner peripheral edge 31 and a curved outer peripheral edge 32 (see especially FIG. 2). Outer peripheral edge 32 is concave and forms a rolling track for the corresponding roller 15. Inner peripheral edge 31, convex in shape, has two rounded recesses 33 at its circumferential ends. Each spacer 17 thus has, in a frontal view, two rounded lateral horns 34 at its outer peripheral edge 32 that become received in the two radially outer connecting regions 35 of the corresponding openings 26 (see especially FIG. 2). The rounded shapes of horns 34 and of said connecting regions 35 are globally complementary. In addition, spaces 36 are formed by recesses 33 between spacer 17 and the edge of opening 26.

The assembly of a pendulum-type damping device 1 of this kind, using a tool having a first frame 37 and a second frame 38, will now be described. Each frame 37, 38 is annular in shape and extends substantially in a radial plane.

First frame 37 has six groups of three first guidance studs 39a, 39b and twelve groups of three second guidance studs 40a, 40b shorter in length than first studs 39a, 39b.

Second frame 38 in turn has twelve groups of three third guidance studs 41a, 41b. Third studs 41a, 41b have substantially the same length as second studs 40a, 40b. All the guidance studs 39a, 39b, 40a, 40b, 41a, 41b are cylindrical, and their free ends can have chamfers.

During the assembly of pendulum-type damping device 1, a first step consists in positioning first parts 3a of masses 3 on first frame 37 (FIG. 3) so that outer faces 19 of parts 3a, 3b abut against face 42 of first frame 17, studs 39a are engaged in recesses 25, and studs 39b are engaged in recesses 23. First part 3a is thus held in position by first guidance studs 39a, 39b and can only slide along them.

First ends 17a of spacers 17 are then positioned opposite openings 26 of first part 3a. This positioning is facilitated by the fact that stud 40b comes into engagement in recess 30 and also comes into abutment against outer peripheral edge 32 of spacer 17, and by the fact that studs 40a come into engagement in spaces 36 and come into abutment against spacer 17. Spacer 17 is thus held in position by second guidance studs 40a, 40b and can only slide along them.

Support 2 is then placed so that one of the radial faces of radially outer annular part 5 abut against the so-called "inner" radial faces 18 of first parts 3a of masses 3 (FIG. 4). During this step, stud 39b is engaged in recess 16 and studs 39a abut against edges 13 of openings 12, more particularly at rounded vertices. Support 2 is thus held in position by first guidance studs 39a, 39b and can only slide along them.

Figure 5:
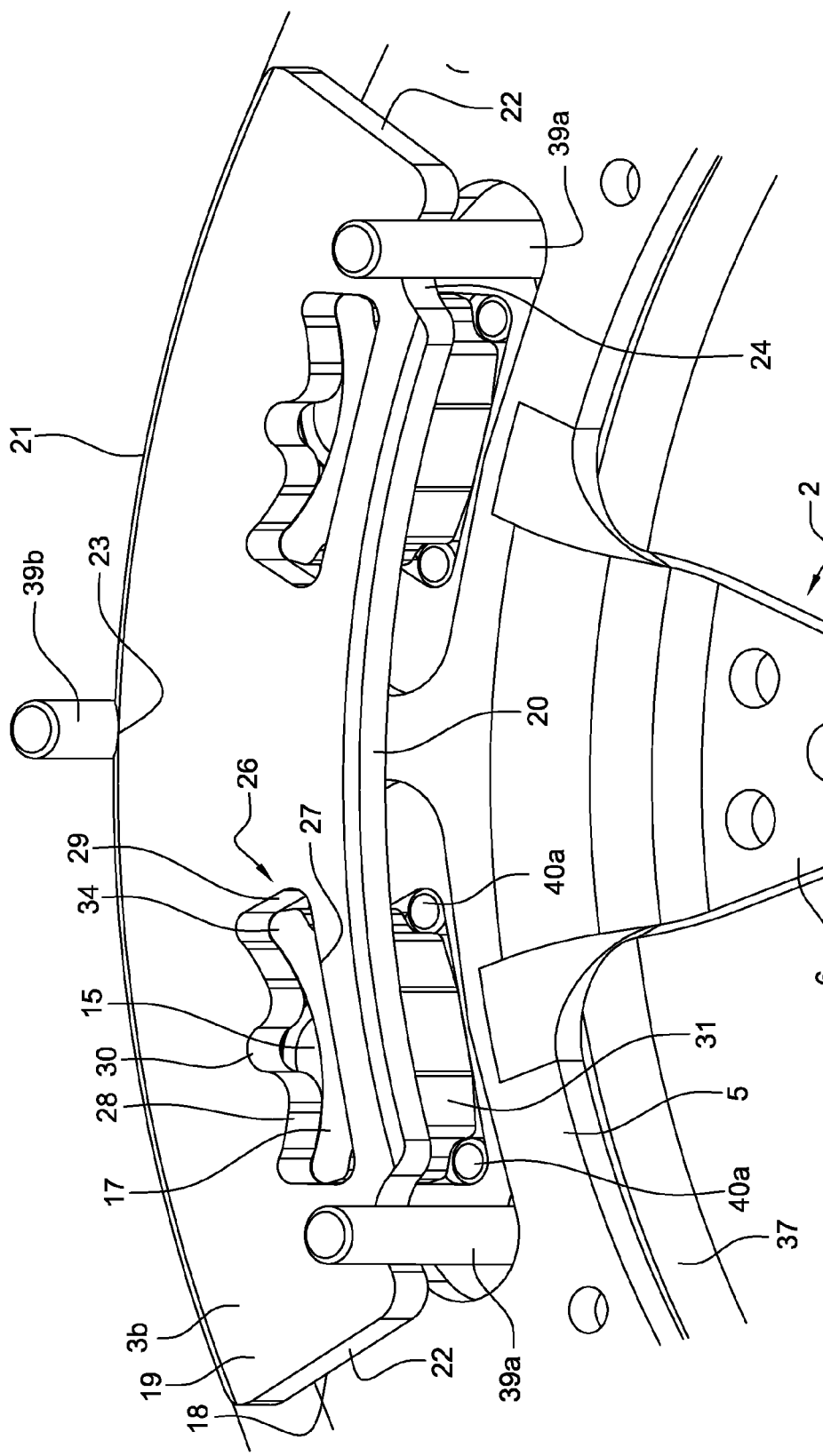
Figure 6:
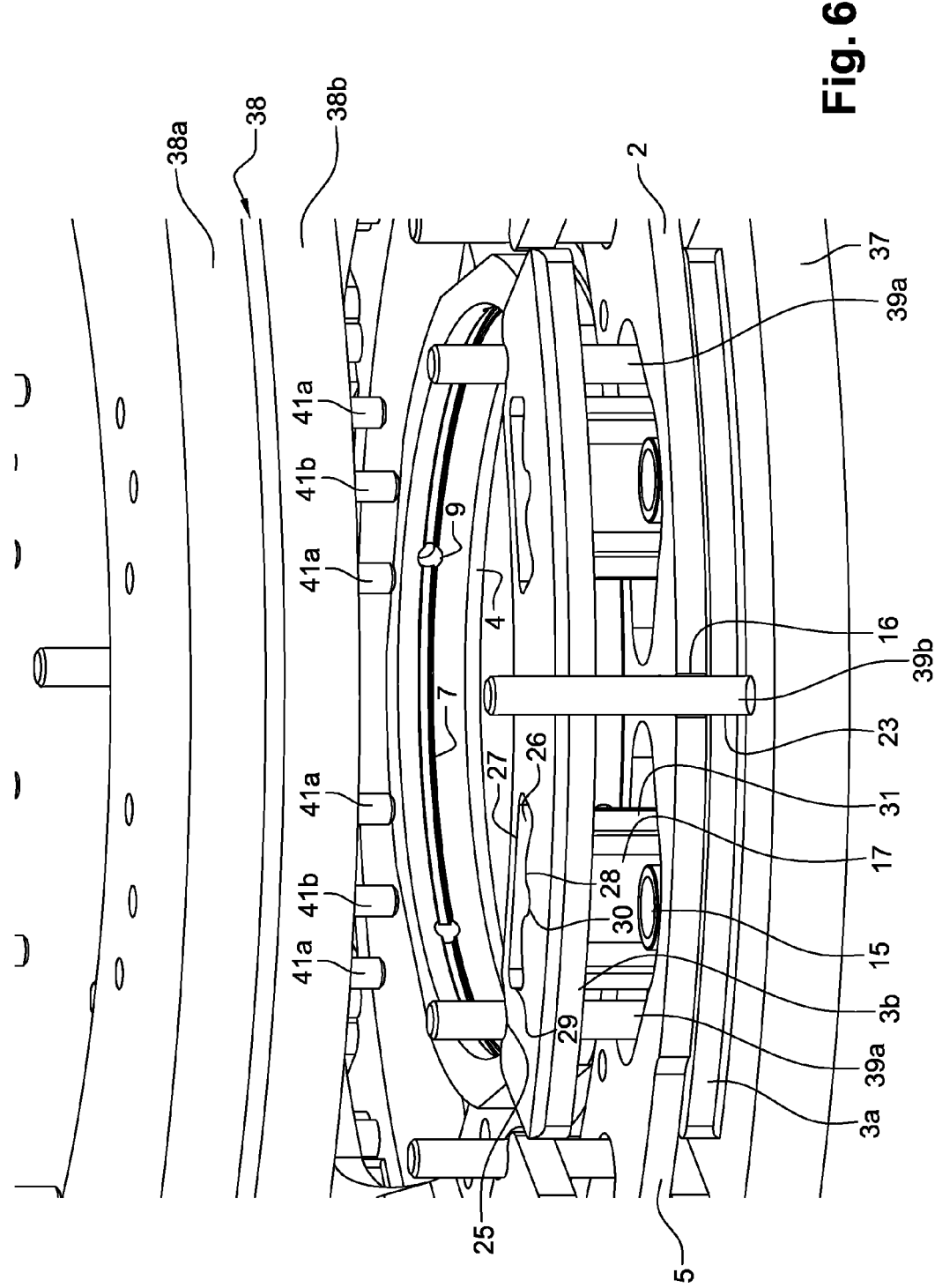

Second parts 3b of masses 3 are then placed opposite first parts 3a so that studs 39b are engaged in recesses 23 of second parts 3b, and so that studs 39a are engaged in recesses 25 of second parts 3b (FIGS. 5 and 6).

Figure 7:
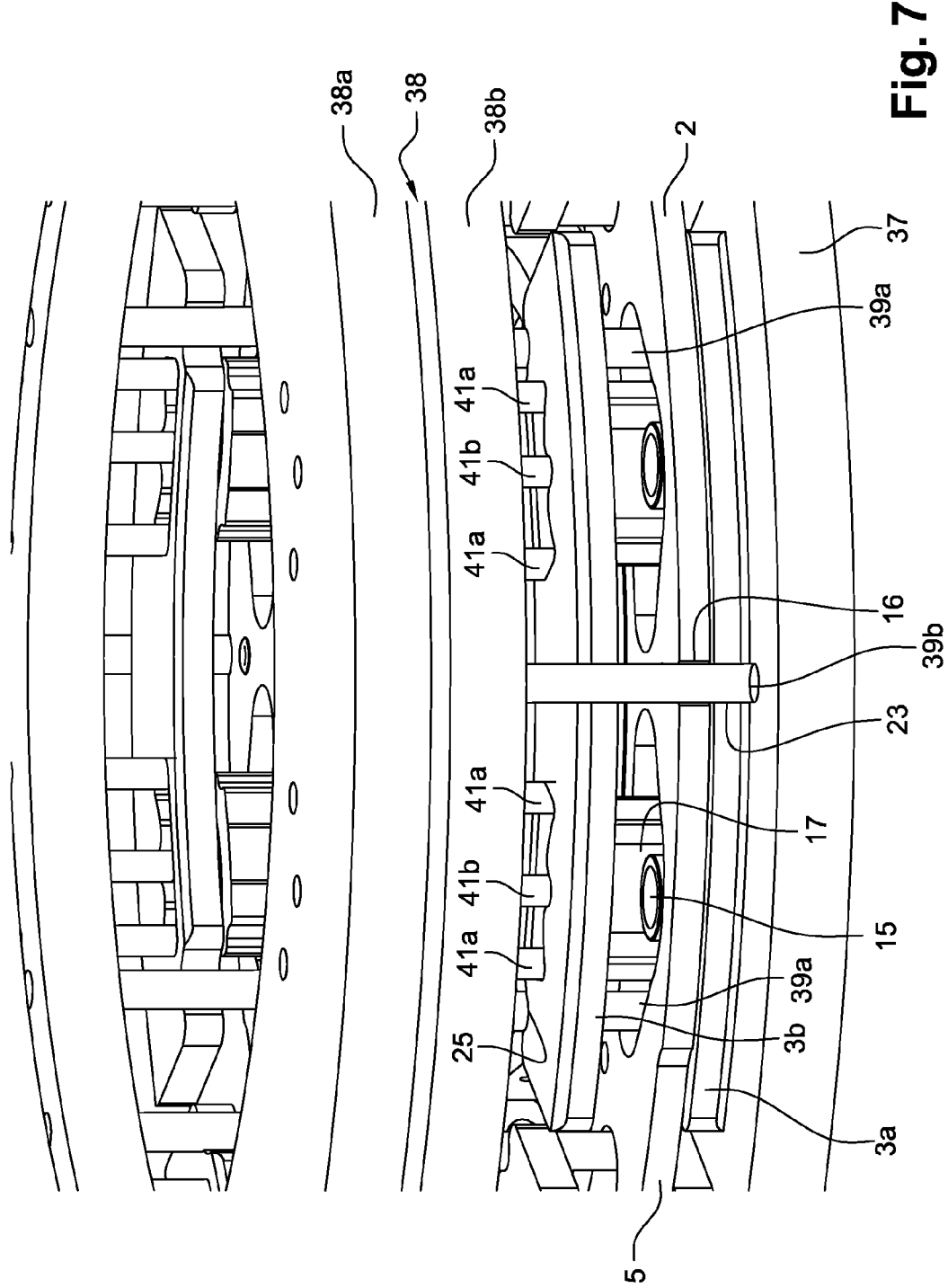

Second frame 38 is then brought opposite first frame 37 (FIG. 7). In the embodiment depicted in FIGS. 6 to 12, second frame 38 has a first annular plate 38a from which third guidance studs 41a, 41b extend, and a second annular plate 38b movable axially with respect to first annular plate 38a. Second annular plate 38b has holes through which third guidance studs 41a, 41b pass, and holes through which first guidance studs 39a, 39b are intended to pass.

Figure 8:
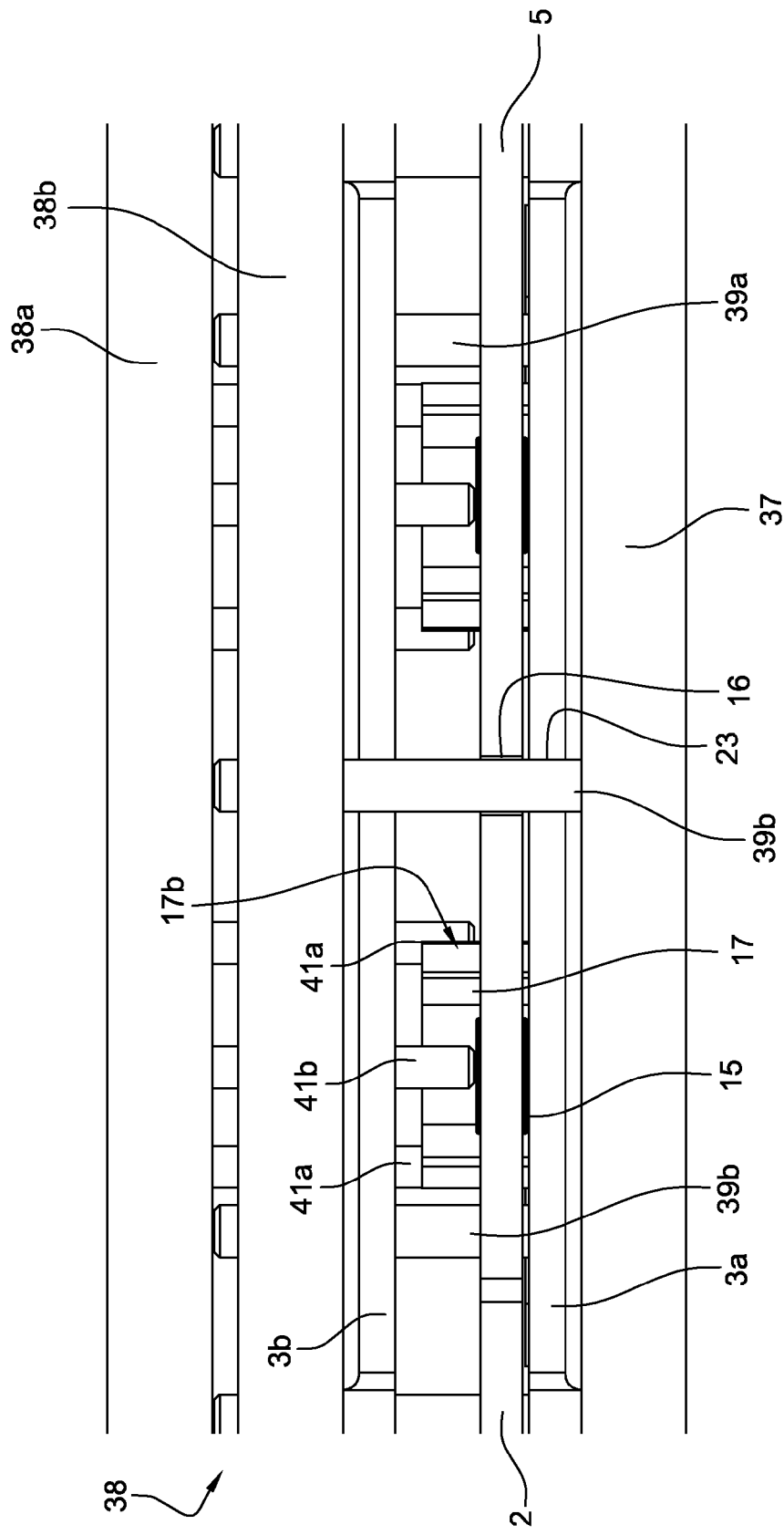

Second frame 38 is brought closer to first frame 37 until first guidance studs 39a, 39b pass through the corresponding holes of second plate 38b. In this position, depicted in FIG. 8, the ends of third guidance studs 41a and 41b become inserted respectively into recesses 30 and into spaces 36 of second parts 3b of masses 3. Third studs 41a, 41b are thus situated axially opposite second studs 40a, 40b, and hold second end 17b of the spacer in position (FIG. 8). The lengths of second studs 40a, 40b and third studs 41a, 41b are adapted accordingly, in particular allowing rollers 15 to be received between the ends of studs 40b and 41b.

Figure 9:
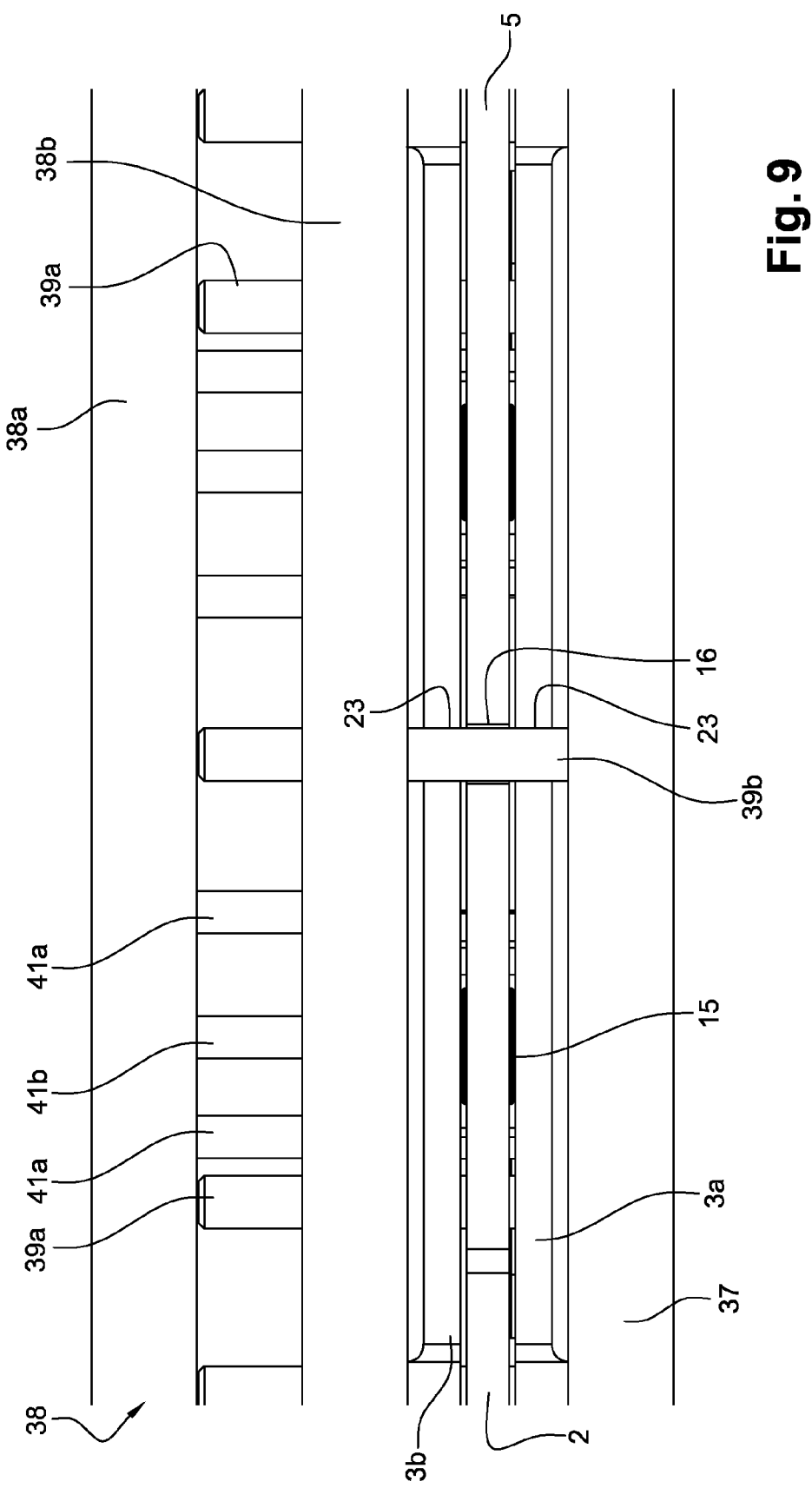
Figure 10:
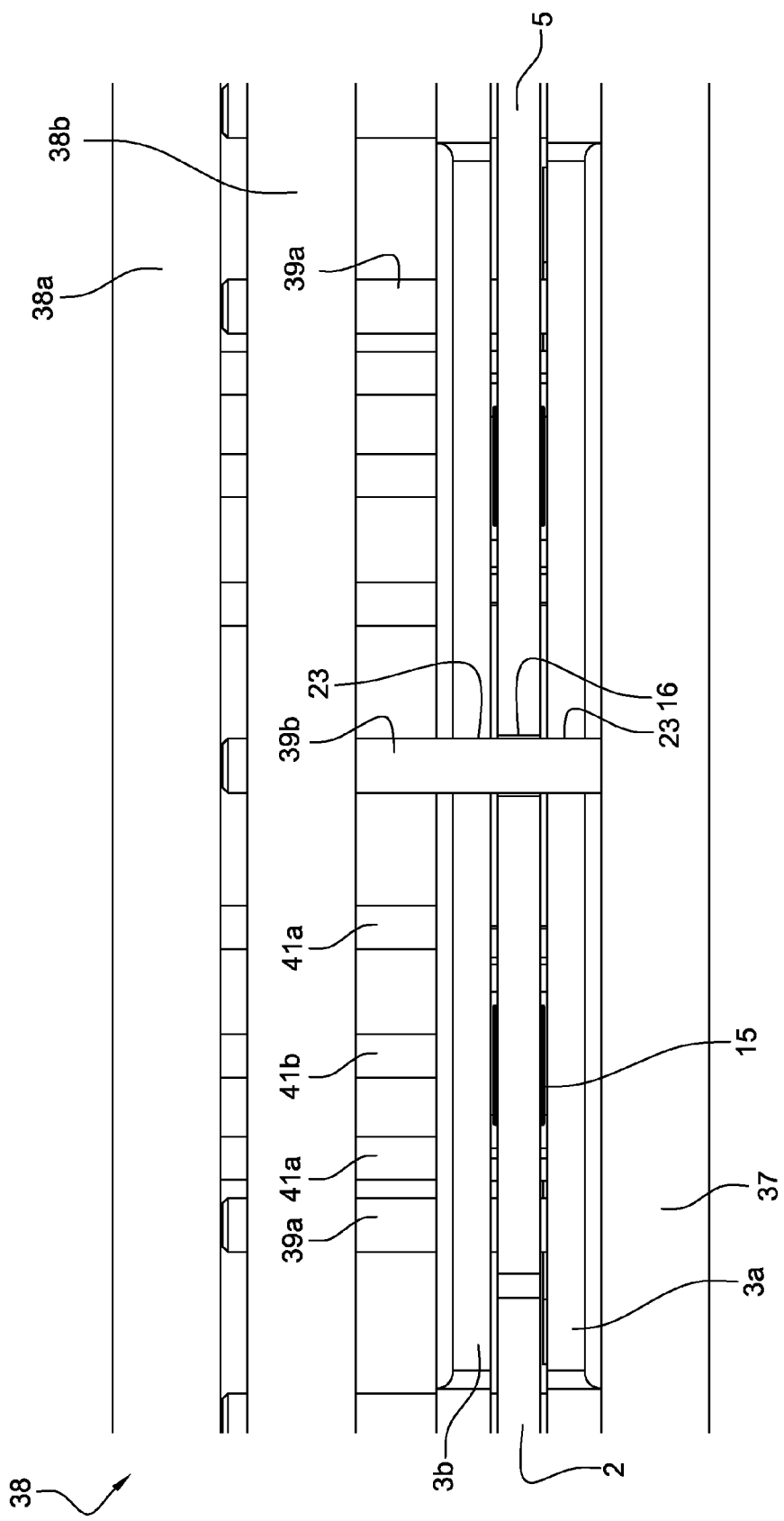
Figure 11:
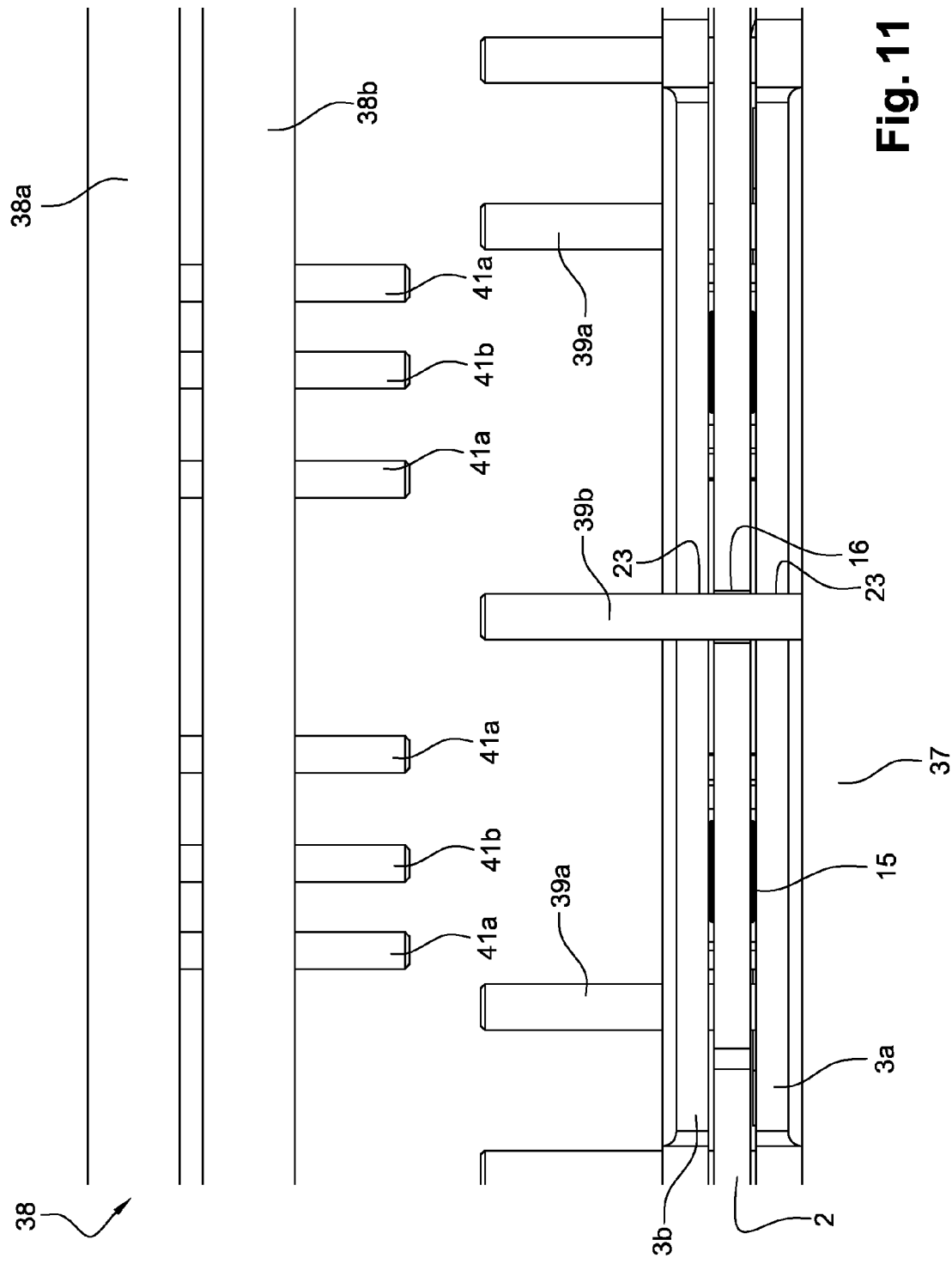
Figure 12:
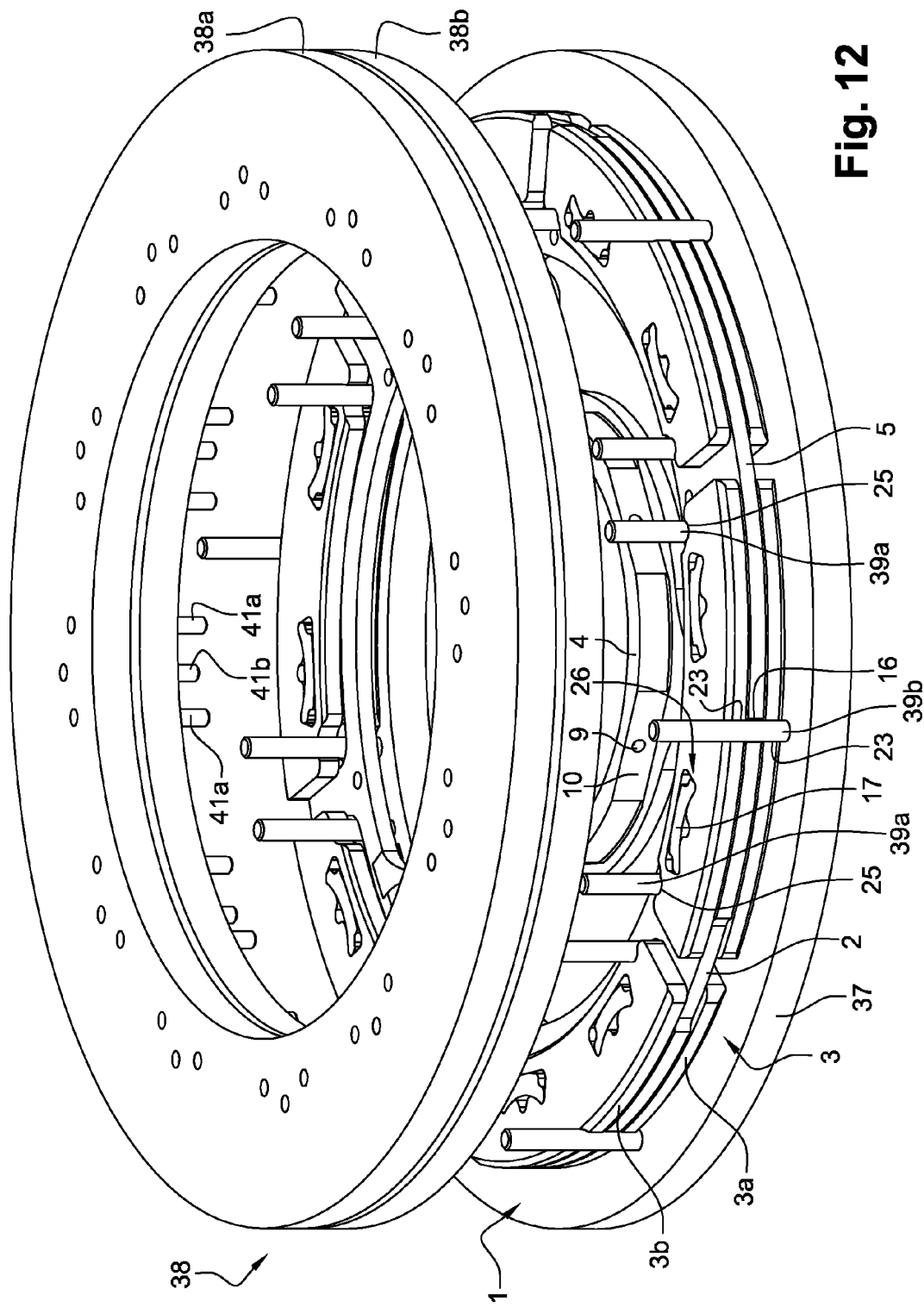

Second plate 38b is then lowered like a press so as to bring the two parts 3a, 3b of each mass 3 together, in order to force first ends 17a of spacers 17 to be introduced into openings 26 of first parts 3a of masses 3, and second ends 17b of spacers 17 to be introduced into openings 26 of second parts 3b of masses 3 (FIG. 9). This force-fitting requires deformation of each end 17a, 17b of spacer 17 and/or deformation of each part 3a, 3b of mass 6, as will be described better below with reference to FIGS. 13 and 14.

Second plate 38b can then again be brought closer to first plate 38a (FIG. 10), then the entire second frame 38 can be moved away from first frame 37 (FIGS. 11 and 12) in order to release pendulum-type damping device 1 that has thus been assembled.

Figure 13:
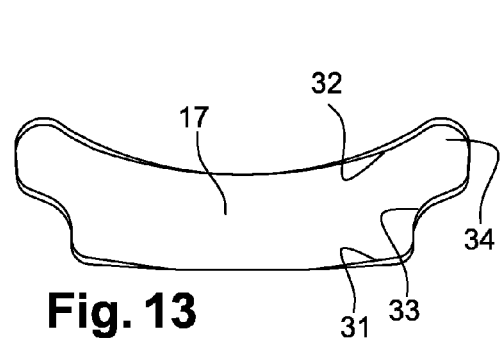
FIG. 13 is a frontal view of an end of a spacer, schematically illustrating the deformation of the latter upon force-fitting thereof.

During force-fitting, first and second ends 17a, 17b of each spacer 17 can deform in response to the force exerted by the second plate. FIG. 13 illustrates a cross section of one end of spacer 17 before force-fitting into the corresponding opening 26 (dashed line) and after force-fitting into opening 26 (solid line). The deformation has been deliberately exaggerated in this Figure.

Figure 14:
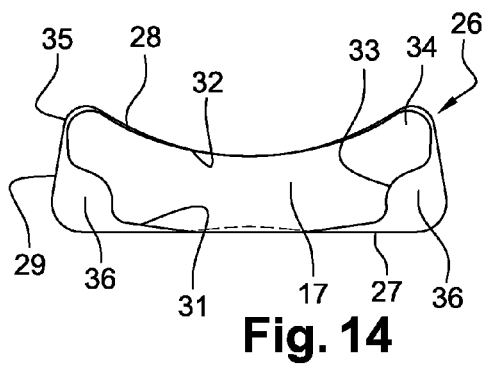
FIG. 14 is a frontal view schematically illustrating the deformation of a part of the mass upon fitting of the spacer into the corresponding opening.

In addition, during force-fitting, parts 3a, 3b of masses 3 can deform during force-fitting of the corresponding ends 17a, 17b of spacers 17, in particular in the regions situated between radially inner edges 27 of openings 26 and radially inner edges 20 of parts 3a, 3b. FIG. 14 illustrates radially inner edge 27 of an opening 26 before force-fitting of spacer 17 (dashed line) and after force-fitting of spacer 17 (solid line). The deformation has been deliberately exaggerated in this Figure.

It is apparent that the shapes of spacers 17 and of openings 26 before assembly are adapted so as to produce the desired geometry after assembly, i.e. after deformation due to force-fitting.

Figure 15:
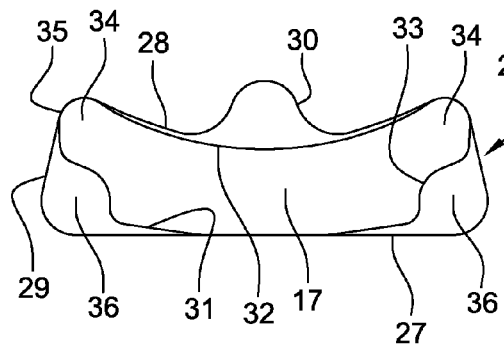
FIGS. 15 through 17 are frontal views illustrating three variants of the fitting of the spacer into a part of the mass.

As depicted in FIG. 15, the shapes of spacers 17 and of openings 26 can be such that after force-fitting, each end 17a, 17b of spacers 17 abuts against radially outer edge 28 of the corresponding opening 26 at lateral horns 34 of spacer 17 and at connecting regions 35 of opening 26.

Figure 16:
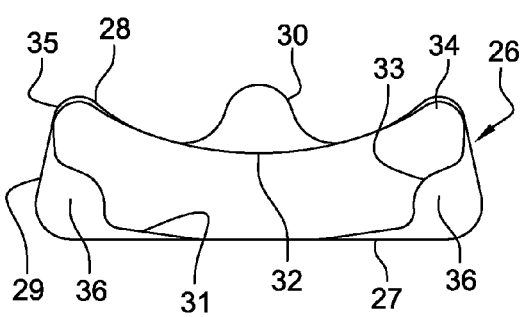

According to another embodiment depicted in FIG. 16, the shapes of spacers 17 and of openings 26 can be such that after force-fitting, each end 17a, 17b of spacers 17 abuts against radially outer edge 28 of the corresponding opening 26 at regions situated between lateral horns 34 and the middle region of radially outer edge 32 of spacer 17.

Figure 17:
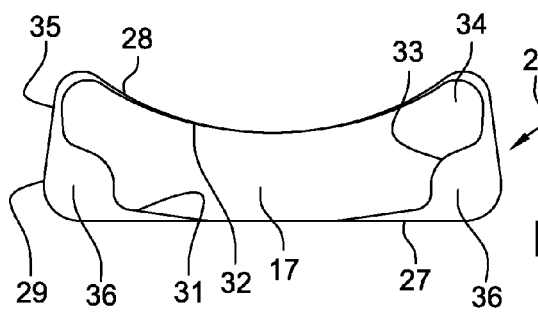

According to yet another embodiment depicted in FIG. 17, the shapes of spacers 17 and of openings 26 can be such that after force-fitting, each end 17a, 17b of spacers 17 abuts against radially outer edge 28 of the corresponding opening 26 at the middle region of radially outer edge 32 of spacer 17. In this case masses 3 have no recesses 30.

In each of these embodiments, only the middle regions of radially inner edges 31 of spacers 17 abut against radially inner edges 27 of openings 26.

Other embodiments are of course also possible.

Figure 18:
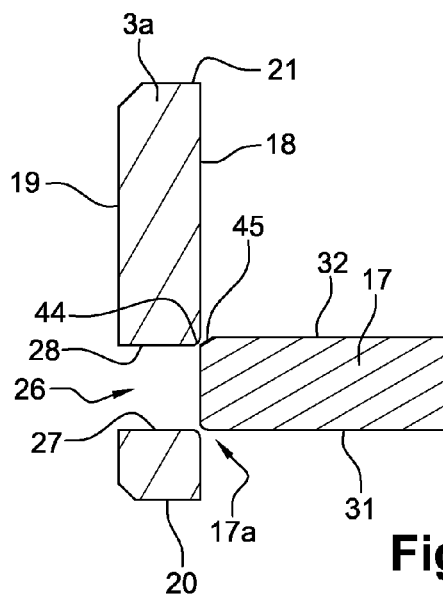
FIGS. 18 and 19 are axial sectioned views of a part of a spacer and of a mass, illustrating two variant embodiments.
Figure 19:
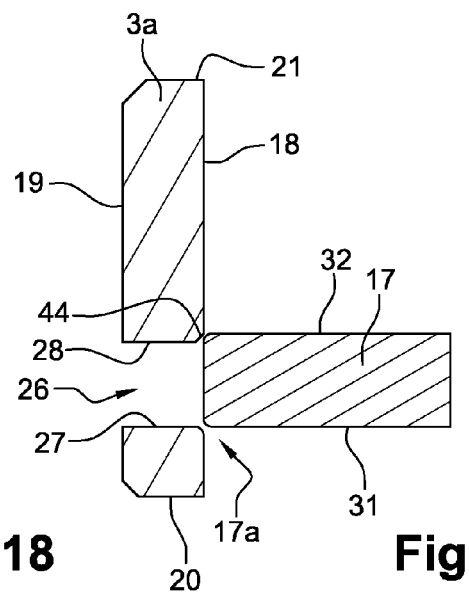

In addition, as depicted in FIGS. 18 and 19, contour 44 of each opening 26 can be rounded or exhibit a chamfer at inner face 18 in order to facilitate insertion and fitting of the corresponding end 17a of spacer 17.

The contour of end 17a of spacer 17 can likewise exhibit a chamfer 45 or a rounding so as to facilitate insertion or fitting thereof into the corresponding opening 26.

The result is to limit contact pressures and to prevent chip formation or degradation of masses 3 during the assembly of pendulum-type damping device 1.

Figure 22:
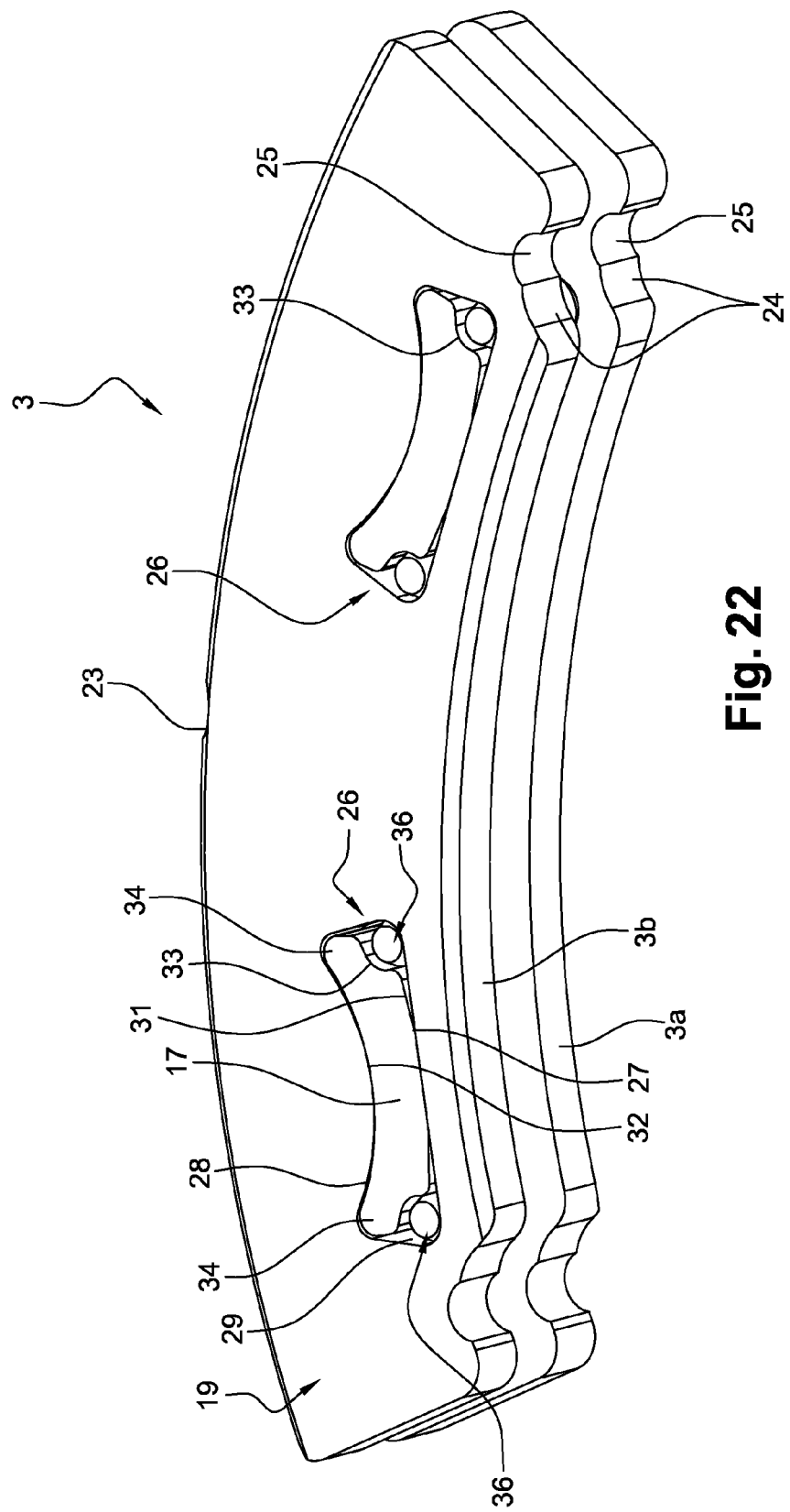

FIGS. 20 to 22 show an embodiment in which each spacer 17 is equipped with two stops 46 made of elastomer. Each stop 46 extends axially and has two chamfered cylindrical ends 47 inserted into spaces 36. Each stop 46 furthermore has a partly enlarged middle region 48 extending circumferentially beyond the corresponding horn 34 and inner edge 31, capable of coming into abutment against the corresponding edge 12 of support 2.

Note that stop 46 does not extend over the entire length of spacer 17, so that spaces 36 situated axially on either side of each stop 46 still exist and permit insertion of the ends of studs 40a and 41a upon assembly of device 1.

Figure 23:
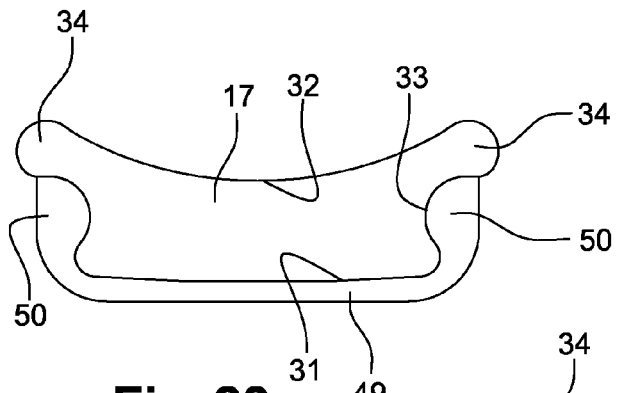
FIG. 23 is a frontal view of a spacer equipped with stop means according to a second embodiment.
Figure 24:
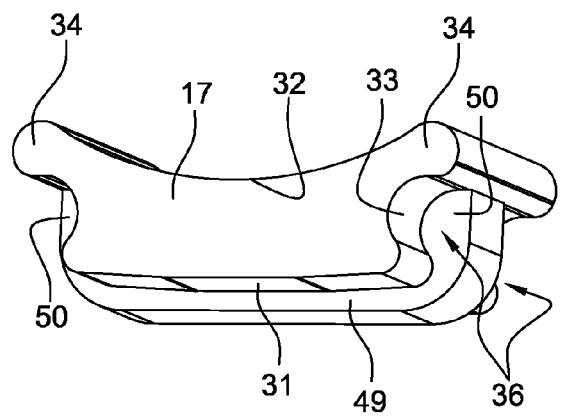
FIG. 24 is a perspective view of the assemblage of FIG. 23.

FIGS. 23 and 24 depict another embodiment in which each spacer 17 has a stop taking the shape of an elastomer strip 49 extending from one horn 34 to the other and running along radially inner side 31 of spacer 17. Strip 49 is placed in the axially middle region of spacer 17 and has two domed ends 50 that snap into recesses 33 that are complementary in shape and placed below the horns in FIG. 23. In this embodiment, elastomer strip 49 can be produced independently of spacer 17 and then snapped into and/or fastened adhesively, for example, onto spacer 17.

Note that as before, the reduced thickness (axial dimension) of elastomer strip 49 allows the retention of spaces 36 situated axially on either side of elastomer strip 49 for the purpose of inserting the ends of studs 40a and 41a upon assembly of device 1. Studs 41a have a length greater than or less than the thickness of the mass, depending on geometry or on the presence of elastomer stops. The stops can furthermore be temporarily deformed by studs 41a during assembly, with no consequence for the product.

Figure 25:
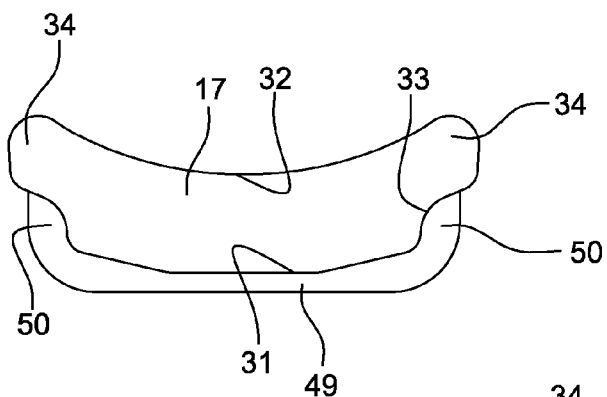
FIGS. 25 and 26 are views that correspond respectively to FIGS. 23 and 24 and illustrate a spacer equipped with stop means according to a third embodiment.
Figure 26:
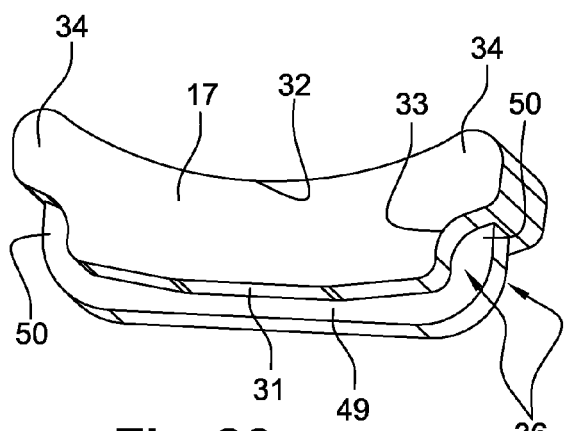

FIGS. 25 and 26 illustrate yet another embodiment of the invention, similar to that of FIGS. 23 and 24 but differing from the latter in that ends 50 of strip 49 are not domed and snapped into recesses 33. In this embodiment, elastomer strip is preferably overmolded onto spacer 17.

Stops 46, 49 of this kind are intended to come into abutment against the edge of the corresponding opening 12 of support 2 in certain operating instances, in particular when the engine is being shut off or started, upon a gear change, and more generally in the event of jerking in the motor vehicle transmission.

After force-fitting, provision can also be made to perform welding of first ends 17a of spacers 17 at the join between first part 3a of mass 3 and second ends 17b of the same spacers. A weld of this kind allows a further improvement in the fastening of spacers 17 onto the two parts 3a, 3b of the masses. The welding will preferably be performed by laser. Welding of this kind can be considered for all the embodiments presented above.

The invention claimed is:

1. A method for assembling a pendulum-type damping device (1) having at least one pendulum mass (3) mounted movably on a support (2), said mass (3) having two parts (3a, 3b) disposed on either side of the support (2) and connected by at least one spacer (17) spanning an opening (12) of the support (2), a roller (15) being disposed between the spacer (17) and an edge of said opening (12), wherein it comprises the steps of:
    (a) positioning a first end (17a) of the spacer (17) into an opening (26) of said first part (3a) with the aid of first guidance studs (39,40,41) mounted to a first frame (37) positioned beneath said first part (3a);
    (b) positioning the support (2) so that the spacer (17) spans the corresponding opening (12) of the support (2);
    (c) positioning the roller (15) between the spacer (17) and the edge of the opening (12) of the support (2);
    (d) positioning a second end (17b) of the spacer (17) into an opening (26) of a second part (3b) of the mass (3) also with the aid of said first guidance studs (39, 40, 41); and
    (e) urging said first frame (37) and a second frame (38), positioned above and abutting said second part (3b), one towards the other, force-fitting said first end (17a) and second end (17b) respectively of said spacer (17) into said openings in said respective first (3a) and second (3b) parts.

2. The method according to claim 1, wherein the ends (17a, 17b) of the spacer (17) are fitted in such a way that they are flush with the outer surfaces (19) of the parts (3a, 3b) of the masses (3).

3. The method according to claim 2, wherein at least one of the ends (17a, 17b) of the spacer is then welded respectively to the two parts of the pendulum mass (3a, 3b).

4. The method according to claim 1, wherein at least one of the ends (17a, 17b) of the spacer is then welded to the respective two parts of the mass (3a, 3b).

5. The method according to claim 1, wherein each part (3a, 3b) of the mass (3) is guided with respect to said first frame (37) with the aid of at least one of said first guidance stud (39a, 39b) projecting from the first frame (37).

6. The method according to claim 5, wherein the spacer (17) has a radially inner edge (31) and a radially outer edge (32), the first frame (37) and second frame (38) respectively having three second guidance studs (40a, 40b) and three third guidance studs (41a, 41b), two (40a, 41a) of which are received in complementary receptacles (33) at the radially inner edge (31) of each spacer (17) and one (40b, 41b) of which is received in a complementary receptacle (30) at the radially outer edge (32) of the spacer (17), or vice versa.

7. The method according to claim 5, wherein the first end (17a) of the spacer (17) is guided with respect to the first frame (37) with the aid of at least one second guidance stud (40a, 40b) projecting from the first frame (37).

8. The method according to claim 5, wherein the second end (17b) of the spacer (17) is guided with respect to a second frame (38) with the aid of at least one third guidance stud (41a, 41b) projecting from the second frame (38).

9. The method according to claim 1, wherein the first end (17a) of the spacer (17) is guided with respect to the first frame (37) with the aid of at least one second guidance stud (40a, 40b) projecting from the first frame (37).

10. The method of according to claim 9, wherein the second guidance stud (40a, 40b) and a third guidance stud (41a, 41b) span the opening of the corresponding part (3a, 3b) of the mass (3) during steps (a) and (d).

11. The method according to claim 9, wherein the second end (17b) of the spacer (17) is guided with respect to a second frame (38) with the aid of at least one third guidance stud (41a, 41b) projecting from the second frame (38).

12. The method according to claim 1, wherein the second end (17b) of the spacer (17) is guided with respect to a second frame (38) with the aid of at least one third guidance stud (41a, 41b) projecting from the second frame (38).

13. The method according to claim 1, wherein each part (3a, 3b) of the mass (3) has a radially inner edge (20) and a radially outer edge (21), the first frame (37) having three first guidance studs (40a, 40b), two (40a) of which are received in complementary receptacles (25) of the radially inner edge (20) of each part (3a, 3b) of the mass (3) and one (40b) of which is received in a complementary receptacle (23) of the radially outer edge (21) of each part (3a, 3b) of the mass (3), or vice versa.

14. The method according to claim 1, wherein each end (17a, 17b) of the spacer (17) has a curved radially inner edge (31) and/or a curved radially outer edge (32), so that each end (17a, 17b) flexes when it is force-fitted into the opening (26) of the first part (3a) and/or the second part (3b) of the mass (3).

15. The method according to claim 1, wherein each part (3a, 3b) of the mass (3) has a deformable region situated radially inwardly from the opening (26) serving for force-fitting of the spacer (17), said region deforming upon force-fitting of the corresponding end (17a, 17b) of the spacer (17).

16. The method according to claim 1, wherein the spacer (17) is equipped with at least one stop (46, 49) intended to come into abutment against the edge of the opening (12) of the support (2) during operation.

17. A pendulum-type damping device (1) having at least one pendulum mass (3) mounted movably on a support (2) intended to be rotationally driven, said mass (3) having two parts (3a, 3b) disposed on either side of the support (2) and said two parts being connected by at least one spacer (17), said spacer spanning an opening (12) of the support (2) to connect said two parts, a roller (15) being disposed between the spacer (17) and an edge of said opening (12), wherein the ends (17a, 17b) of the spacer (17) are fastened to the two parts (3a, 3b) of the mass (3) by force-fitting into openings in said respective two parts of the mass and said spacer forms, between the two parts (3a,3b), a rolling surface for said roller.

18. The device according to claim 17, wherein the ends (17a, 17b) of the spacer (17) are flush with the outer surfaces (19) of the parts (3a, 3b) of the mass (3).

19. The device according to claim 17, wherein at least one of the ends (17a, 17b) of the spacer (17) is also fastened respectively to the two parts (3a, 3b) of the pendulum mass (3) by welding.

* * * * *